United States Patent
Bodurka

(10) Patent No.: US 10,032,366 B2
(45) Date of Patent: Jul. 24, 2018

(54) REMOTELY CONFIGURABLE SENSOR SYSTEM AND METHOD OF USE

(71) Applicant: The Chamberlain Group, Inc., Elmhurst, IL (US)

(72) Inventor: Alex Josef Bodurka, Chicago, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 14/880,422

(22) Filed: Oct. 12, 2015

(65) Prior Publication Data
US 2017/0103648 A1 Apr. 13, 2017

(51) Int. Cl.
G05B 19/00 (2006.01)
G08G 1/01 (2006.01)

(52) U.S. Cl.
CPC ..................... *G08G 1/01* (2013.01)

(58) Field of Classification Search
CPC ............. G07C 9/00309; G07C 9/00103; E05F 15/2076; E05F 15/60; B60Q 1/48; B60Q 9/007; G01V 11/00; G08B 29/20; G08G 1/14; G08C 17/02
USPC ... 340/5.71, 5.7, 5.61, 941, 932.2, 435, 507, 340/3.71, 511, 5.64, 628, 540; 49/13, 14
See application file for complete search history.

(56) References Cited

U.S. PATENT DOCUMENTS

| | | | |
|---|---|---|---|
| 5,610,590 A * | 3/1997 | Johnson | A61B 5/11 200/61.45 R |
| 5,623,259 A * | 4/1997 | Giangardella | B60Q 1/48 340/435 |
| 9,230,378 B2 * | 1/2016 | Chutorash | G07C 9/00182 |
| 2005/0128067 A1 * | 6/2005 | Zakrewski | G08B 29/20 340/511 |
| 2005/0237206 A1 * | 10/2005 | Cuddihy | G08B 21/028 340/573.1 |
| 2008/0136589 A1 * | 6/2008 | Baird | G08B 15/001 340/5.64 |
| 2010/0082274 A1 * | 4/2010 | Son | G01H 1/00 702/56 |

(Continued)

OTHER PUBLICATIONS

AutomationDirect; Capacitive Proximity Sensors/Proximity Switches; http://www.automationdirect.com/adc/Overview/Catalog/Sensors_-z-_Encoders/Capacitive_Proximity_Sensors?gclid=CK2RvuDt3r8CFQOPaQodslAAgg&s_kwcid=ALI3683!3!20669060903!b!!g!!capacitive%20prox%20sensor&ef_id=U5i8BgAABGvpTBED: 20140724210838:s; 3 pages; Product available as early as Jul. 2014.

(Continued)

*Primary Examiner* — Firmin Backer
*Assistant Examiner* — Munear Akki
(74) *Attorney, Agent, or Firm* — Fitch Even Tabin & Flannery LLP

(57) ABSTRACT

A remotely configurable sensor and method for remotely configuring detection of a vehicle in a secured area for housing the vehicle are provided. The method includes providing a sensor in the secured area to detect the vehicle; wirelessly coupling a computing device to the sensor; displaying a configurable sensor setting on a display coupled to the computing device, the configurable sensor setting including at least one of the group consisting of a detection sensitivity, a detection duration, a threshold distance, a rate of approach, a detection rate when idle, a detection rate when active, a threshold distance for an active state, and a detection area; and saving a change to the configurable sensor setting at the sensor.

19 Claims, 5 Drawing Sheets

(56) References Cited

U.S. PATENT DOCUMENTS

| | | | | |
|---|---|---|---|---|
| 2010/0134240 | A1* | 6/2010 | Sims | G08C 17/02 340/5.1 |
| 2010/0289618 | A1* | 11/2010 | Crucs | G08C 17/00 340/5.61 |
| 2011/0251752 | A1* | 10/2011 | DeLarocheliere | G07C 5/008 701/31.4 |
| 2012/0274483 | A1* | 11/2012 | Pallas Areny | G01V 11/00 340/941 |
| 2013/0127641 | A1* | 5/2013 | Groult | E04H 6/426 340/932.2 |
| 2016/0101730 | A1* | 4/2016 | Shehan | B60Q 9/008 340/431 |
| 2016/0130853 | A1* | 5/2016 | Tehranchi | E05F 15/60 340/3.71 |
| 2016/0144817 | A1* | 5/2016 | Chambers | B60R 21/0136 340/436 |
| 2017/0098374 | A1* | 4/2017 | Sullivan | G06F 17/00 |

OTHER PUBLICATIONS

Banner Engineering; Products & Applications; Radar Sensors; http://www.bannerengineering.com/en-US/products/8/Sensors/658/Radar-Sensors?gclid-CJn8k5bp3r8CFQgGaQodjbMAkg; 2 pages; Aug. 30, 2013.

Chamberlain LiftMaster 975LM Laser Parking Assist; http://www.amazon.com/Chamberlain-LiftMaster-975LM-Parking-Assist/dp/B000JHM2AU/ref=sr_1_7?s=hi&ie=UTF8&qid=1406233890&sr=1-7&keywords=parking+aid; 6 pages; Product available as early as 2008.

Combined Video and Radar Detection Improves Safety and Efficiency at Intersections; http://www.flir.com/cs/emea/en/view/?id=61356; 11 pages; 2013.

Driveway Patrol; http://www.amazon.com/Driveway-Patrol-Receiver-Discontinued-Manufacturer/dp/B0000645RH/ref=sr_1_3?s=hi&ie=UTF8&qid=1406234778&sr=1-3&keywords=Camera+vehicle+detector; 6 pages; Product available as early as 2005.

EMX VMD202-50 Driveway Sensor with Adjustable Sensitivity, 50 foot cable; http://www.smarthome.com/emx-vmd202-50-driveway-sensor-with-adjustable-sensitivity-50-foot-cable.html, 2 pages; Product available as early as 2011.

IO-Link System Description/Technology and Application; http://www.io-link.com/share/ Downloads/At-a-glance/IO-Link_System_Description_engl_2013.pdf; 20 Pages; Dec. 15, 2013.

Park'N Place—Deluxe Version with Added Hazard Lighting; http://www.amazon.com/Place--Version-Lighting-Roadside-Emergencies/dp/B0043EQXAU/ref=sr_1_1?ie=UTF8&qid=1406233797&sr=8-1&keywords=park%27n+place; 6 pages; Jul. 3, 2014.

Park Zone Precision Parking—Stop Light System/Aid for Garage; http://www.amazon.com/Park-Zone-Precision-Parking-Device/dp/B00005AXI6/ref=sr_1_3?s=hi&ie=UTF8&qid=1406233890&sr=1-3&keywords=parking+aid; 6 pages, Product available as early as 2003.

Prime-Line Products GD 52286 Stop-Right, Retracting Stop Ball for Garages; http://www.amazon.com/Prime-Line-Products-GD-52286-Stop-Right/dp/BOODS596MM/ref=sr_1_4?s=hi&ie=UTF8&qid=1406234207&sr=1-4&keywords=parking+sensor, 6 pages; Product Available as early as 2013.

Reno Preformed Loop (24 ft. perimeter/50 ft. lead-in); http://www.amazon.com/Reno-Preformed-Loop-perimeter-lead-/dp/B000HQ8HFC/ref=sr_1_27?s=hi&ie=UTF8&qid=1406234293&sr=1-27&keywords=Vehicle+Inductive+sensor, 3 pages; Product available as early as 2007.

Sparkfun; Ultrasonic Range Finder—LV—MaxSonar-EZ1; https://www.sparkfun.com/products/639; 3 pages, Jan. 24, 2013.

Striker Hand Tools 00-108 Parking Attendant Garage Parking Sensor; http://www.amazon.com/gp/product/B002WV8F6Q/ref-pd_sim_hg_5?e=UTF8&refRID=08XDD23KZCY1QQSBHWRW; 6 pages; Product available as early as 2011.

* cited by examiner

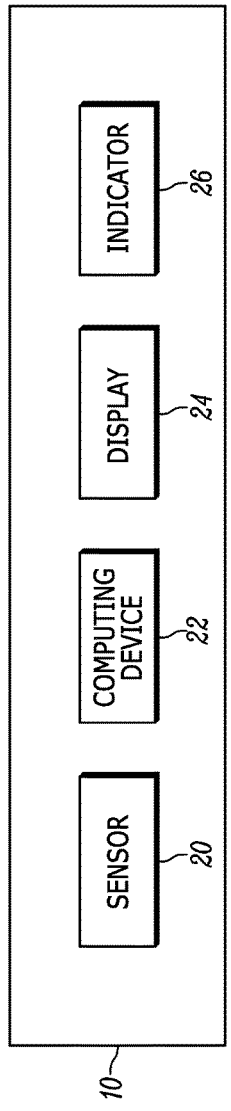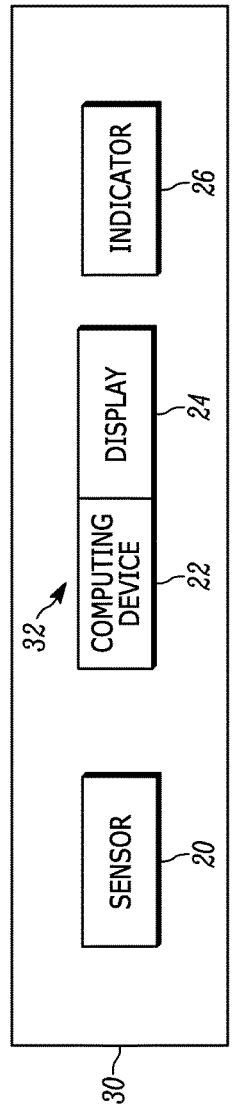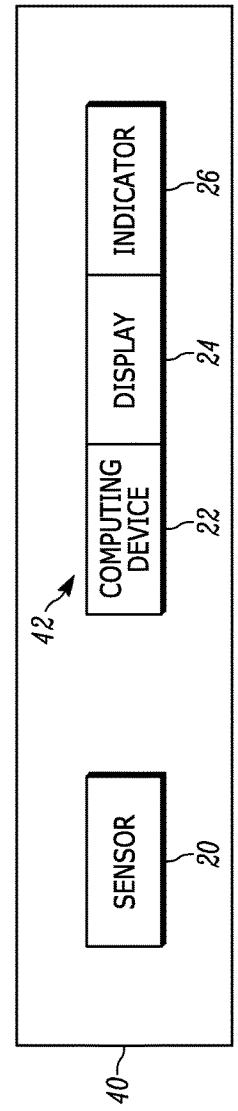

REMOTELY CONFIGURABLE SENSOR SYSTEM AND METHOD OF USE

FIELD

A remotely configurable sensor system is provided and, more particularly, the sensor system is remotely configurable via a wireless device for detection of a vehicle in a secured area for housing the vehicle.

BACKGROUND

Placement of a vehicle in secured area, such as a garage, has been an increasingly complicated process as people attempt to position more vehicles, bicycles, etc. in garages to maximize space. Further, the position of some vehicles within a secured area may be difficult to determine while driving the vehicle as the ride height, slope of the hood, and other factors make it difficult judge where the edges of the vehicle are actually positioned.

In view of these and other issues, a number of vehicle sensors have been developed for use in the secured area, such as for being placed within a garage. These vehicle sensors rely on any number of different sensing technologies to determine the position, speed, and the like of a vehicle relative to the sensor.

While such sensors may be configurable for different distances, positions, vehicles, and the like, the configuration is typically physically performed at the sensor by adjusting one or more knobs, buttons, or other adjustable inputs. However, when configured in such a manner, the user typically moves the vehicle and then has to get out of the vehicle to adjust the sensor, which oftentimes has to be repeated until the user is able to get the vehicle and sensor properly configured for the desired position and sensitivity. Alternatively, two people can configure the sensor where one person drives the vehicle while another adjusts the sensor. In this form, it may be complicated for the person adjusting the sensor as the vehicle may be in motion while the second person is adjusting the sensor.

SUMMARY

According to one form, a method for remotely configuring detection of a vehicle in a secured area for housing the vehicle is provided. In this regard, a user does not need to be physically at a sensor to adjust the sensor, but instead may be positioned in the vehicle or in another location remote from the sensor such that there is decreased danger of the user being injured by the moving vehicle.

In accordance with one form, the method includes providing a sensor in the secured area to detect the vehicle; wirelessly coupling a computing device to the sensor; displaying a configurable sensor setting on a display coupled to the computing device, the configurable sensor setting including at least one of the group consisting of a detection sensitivity, a detection duration, a threshold distance, a rate of approach, a detection rate when idle, a detection rate when active, a threshold distance for an active state, and a detection area; and saving a change to the configurable sensor setting at the sensor.

This disclosure also describes a system for remotely configuring detection of a vehicle in a secured area for housing the vehicle. In one example, the system includes a sensor, a computing device, and a display. The sensor has a configurable sensor setting. The computing device is wirelessly coupled to the sensor. The display is coupled to the computing device for displaying the configurable sensor setting. The configurable sensor setting includes at least one of the group consisting of a detection sensitivity, a detection duration, a threshold distance, a rate of approach, a detection rate when idle, a detection rate when active, a threshold distance for an active state, power settings, communication settings, and a detection area.

In accordance with one form, a method for detection of a vehicle in a secured area for housing the vehicle is provided. The method includes providing a sensor in the secured area to detect the vehicle; wirelessly coupling a remote device to the sensor, the remote device selected from the group consisting of a movable barrier operator, a mobile computing device, and a vehicle computing device; and detecting at the sensor at least one of a distance of the vehicle from the sensor, a rate of approach of the vehicle to the sensor, and a position of the vehicle in a predetermined position relative to the sensor. The detecting can optionally occur in response to operation of a movable barrier operator. The method further includes providing an alert to the remote device indicative of the detection at the sensor of at least one of the distance of the vehicle from the sensor, the rate of approach of the vehicle to the sensor, and the position of the vehicle in a predetermined position relative to the sensor.

In one approach, the method further includes providing a signal to the computing device indicative of sensing the vehicle in the secured area. Optionally, the current status of the configurable sensor setting is displayed. The method may also include displaying a range of adjustment available for the configurable sensor setting.

In one form, the method further includes changing a configurable sensor setting, the configurable sensor setting including at least one of the group consisting of a power setting, a detection sensitivity, a detection duration, a threshold distance, a rate of approach, a detection rate when idle, a detection rate when active, a threshold distance for an active state, and a detection area.

Optionally, the method further includes providing an alert indicative of sensing a vehicle in the secured area, the alert selected from the group consisting of text, graphics, lights, vibration, audio, and combinations thereof. The alert may be provided at the remote device or at a device other than the remote device.

In accordance with one form, the sensor is in a passive, power saving mode until the detecting step begins in response to operation of a movable barrier operator, detection of a mobile computing device, movement, or other activating condition.

According to one form, the system further includes an indicator providing an alert indicative of sensing a vehicle in the secured area, the alert selected from the group consisting of text, graphics, lights, vibration, audio, and combinations thereof. In one form, the indicator is the display. In various examples, the indicator is selected from the group consisting of a light, a speaker, a movable barrier operator, a vehicle display system, a mobile computing device, an automation interface, and combinations thereof.

According to one form, the sensor detects at least one of a position of the vehicle in the secured area, a presence of the vehicle in the secured area, a rate of approach of the vehicle to the sensor, a change in movement of the vehicle in the secured area, and a distance of the vehicle from the sensor. For example, the sensor can detect the vehicle through at least one of sound, light, radio, induction, thermal, and vibration.

These and other aspects may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 2A is a diagram of one form of a system for remotely configuring detection of a vehicle;

FIG. 2B is a diagram of another form of a system for remotely configuring detection of a vehicle;

FIG. 2C is a diagram of yet another form of a system for remotely configuring detection of a vehicle;

DETAILED DESCRIPTION

Figure 1:
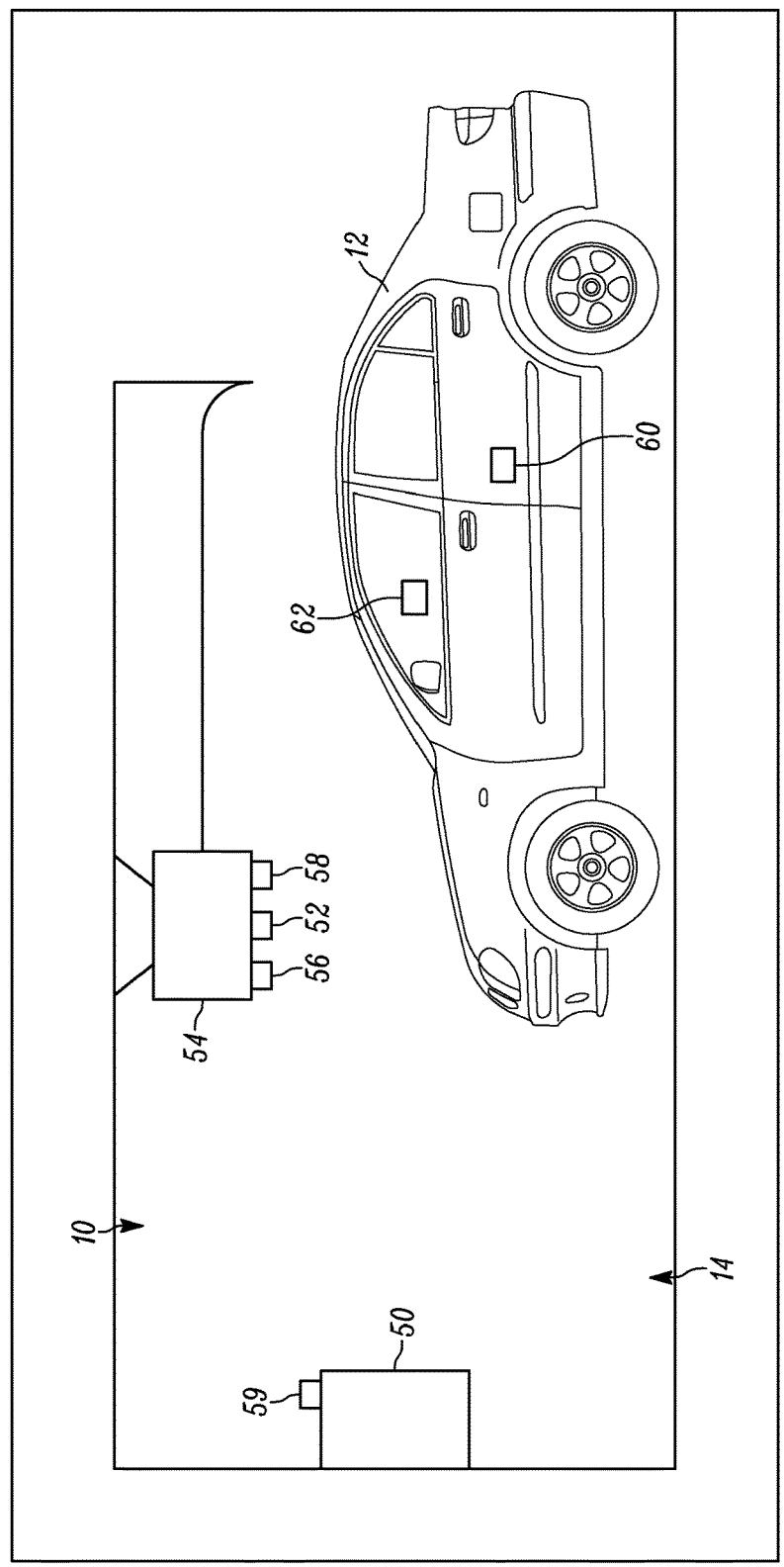
FIG. 1 is an illustration of one form of a system for remotely configuring detection of a vehicle in a secured area for housing the vehicle.

Referring to FIG. 1, there is illustrated one form of a system 10 for remotely configuring detection of a vehicle 12 in a secured area 14 for housing the vehicle 12. It should be appreciated that system 10 can not only configure detection of the vehicle 12, but the system 10 can also be used for the actual detection of the vehicle 12 after configuration. This detection can also include detection of a vehicle in relation to a reference point or structure. Further, the sensor can also be used to detect other conditions, such as environmental conditions, human presence, and other detectable conditions.

Referring to FIGS. 2A-C, various forms of the system 10 are illustrated. Generally, as shown in FIG. 2A, the system 10 includes a sensor 20, a computing device 22, a display 24, and an indicator 26. In one form, the sensor 20 includes at least one configurable sensor setting. The computing device 22 can be wirelessly coupled to the sensor 20 such that the computing device 22 can be used to remotely configure the sensor setting.

The display 24 can be coupled to the computing device 22 and/or the sensor 20 so as to provide a display for configuring the sensor setting. The display 24 can be coupled to the computing device 22 and/or sensor 20 wirelessly, directly, indirectly, and the like.

The indicator 26 is configured to provide feedback to a user regarding the status of the sensor 20 and/or vehicle 12 in the secured area 14. For example, the indicator 26 can provide a display, light, speaker, sound, vibration, or other detectable indication. The indicator 26 can be coupled to one or more of the sensor 20, computing device 22, and display 24 wirelessly, directly, indirectly, and the like. As shown in FIG. 2A, each of the sensor 20, computing device 22, display 24, and indicator 20 are all separate devices.

Exemplary alternative forms of systems are shown in FIGS. 2B and 2C, though other forms are also contemplated. In one form, such as in system 30 of FIG. 2B, the display 24 may be integral with the computing device 22, such that they form a single device 32. Device 32 may take a variety of forms including, but not limited to, a mobile phone, tablet, notebook computer, a vehicle display system, or the like. The device 32 may include one or more inputs (not shown) such as a touchscreen, keyboard, mouse, or other input suitable for a user to interact with the computing device 22 and/or sensor 20. Yet another form is shown in FIG. 2C as system 40. In system 40, the computing device 22, display 24, and indicator 26 may be included in a single device 42. In yet another form, the indicator 26 may be connected to the sensor, such as shown in FIG. 1 with sensor 50 and indicator 59.

The systems, components, methods of use, and the like will now be discussed in more detail below. It should be appreciated that any of the systems 10, 30, 40 and devices 32, 42 may accommodate the different devices and combinations of features described below, unless specifically noted otherwise.

The sensors used herein may include any number and/or combinations of different sensor device technologies. Such sensor technologies may be based on sound, light, radio, inductive, thermal, vibration, or capacitive technologies, and the like. Each technology can be provided in any number of different implementations. For example, each technology has the ability to have an active and a passive form. Passive forms generally detect environmental changes in the properties.

Active detection requires producing energy in the active form and detecting the return of that energy. Active sound detection generally works by producing a short burst sound wave that travels from the sensor and returns to the sensor only if an object was in its path causing reflection back to the sensor. Simple detection of a vehicle can be performed by detecting the amount of reflected energy return to the sensor. Distance can be detected by measuring the amount of time it takes for the reflection to return to the sensor. By knowing the speed of sound in air one can determine the distance between the sensor and the reflective object. The reflective object would be of course the vehicle or a closed garage door.

Passive sound detection can also be utilized to detect the vehicle because vehicles are relatively noisy when pulling into the garage. Although passive sound detection can perform the detection of vehicle, active sound detection has been considered more reliable. However, passive and active sound detection can be used together.

Generally, sound detection using ultrasonics has been preferred over sound in the audible range. For example, it is oftentimes easier to create a directional beam of sound without having extremely large sensor by using high frequencies. In order to get a narrow beam in ultrasonics, the transducer with needs to be around 10 to 20 times the wavelength. Generally speaking ultrasonic transducers are utilized in the 40 to 50 kHz range.

Further, light and/or optical sensors can also be used. Just as with sound, light and/or optics can be used at different frequencies, making it visible and invisible. For example, passive infrared detectors have been utilized in a variety of situations, such as for detecting people, vehicles, and the like. However, such sensors may have problems detecting a vehicle when the vehicle has not been run for a while and is cold. Other passive infrared detectors can also be used, such as with a single bit camera system. Similar systems may use a camera to do image recognition in order to detect a vehicle. The area of detection can be controlled by controlling the amount of the imaging array utilized. Active light systems may also be used. Such systems may include a technology called time of flight. Time of flight measures the time light travels similar to the method used for ultrasonics. Other light and/or optical sensors may also be used including, but not limited to thermo/PIR and the like.

Magnetic sensors may also be used as most vehicles include appropriate materials for detection. In one form, a magnetic loop is mounted into the ground. Alternatively, a rod antenna magnetic sensor can be used. Other forms of sensors can also be used including, but not limited to, capacitive sensors, radio frequency sensors, mechanical sensors, and the like. In one form, time of flight sensors may be used. According to one form, lower powered sensors are used and are battery powered.

The sensors may also be battery powered, solar powered, plugged in to an electrical outlet, hardwired to a power source, or powered by any other conventional means.

Multiple sensors may also be used in combination to achieve improved performance, accuracy, lower power consumption, and the like. For example, one type of sensor may be used to perform the initial sensing with a different sensor performing sensing while a vehicle is in motion. In this regard, the initial sensor may have a lower power consumption, but may not be as accurate and/or fast such that the initial sensor triggers the second sensor, which may be more accurate and/or fast, but may also consume more power. Similarly, different sensors may be used in combination to detect different locations, positions, speed of movement, and the like.

These sensor technologies oftentimes require calibration or other adjustments for the specific vehicle, secured area, desired approach speed, desired distance, as well as other configurations. Also, users may wish to adjust certain configurations for the particular application or simply the user's preference. For example, a user may wish to extend battery life as long as possible and may set one or more configurations for this type of operation. Further, the sensor may be configured to provide a notification regarding the status of the battery.

In this regard, one or more sensors are typically positioned in a secured area, such as in a garage, to detect a vehicle. However, each user may have a very different garage size, layout, vehicle, and the like such that the sensor should be configured for the specific user's needs. Furthermore, the sensor can be located in various areas of the secured area. For example, as shown in FIG. 1, a sensor 50 may be located at a rear position of the secured area 14. Sensors may be located in other areas, such as shown by sensor 52 which is positioned on or near movable barrier operator 54. It should be appreciated that sensors may be located in other positions in and around a secured area for detecting a vehicle. For example, a sensor may be positioned on or near the ground, at a front side of the secured area 14, outside of the secured area 14, and the like. Furthermore, multiple sensors may be used in the secured area 14, either alone or in combination with one another. For example, one sensor may be used to detect position while another sensor is used to detect approach speed. In another form, one sensor may be used to detect position relative to a first wall while another sensor is used to detect position relative to a different wall.

The sensor 20 may also include one or more sensor computing devices that can be used to control the sensor 20, configure the sensor 20, analyze data received by the sensor 20, communicate with other devices such as indicators, movable barrier operators, and other computing devices, as well as other functionality. The sensor computing device may be incorporated within the sensor 20 such as at sensor 50 and/or be located remotely from the sensor, such as sensor 52 and sensor computing device 56 in FIG. 1. In one form, the sensor computing device may be used to wirelessly couple the sensor to the computing device 22 for configuring sensor settings or otherwise provide computing for data received at the sensor.

The computing device 22 may directly and/or indirectly communicate with the sensor. For example, the computing device 22 may directly communicate with the sensor 20 via a wireless communication method, such as radio frequencies, infrared, and the like. In one form, the computing device 22 can communicate with the sensor 20 via Wi-Fi and/or Bluetooth communication. In another form, the computing device 22 may communicate with an intermediate device, such as a movable barrier operator or controller, which then communicates with the sensor 20 so that the overall communication between the computing device 22 and sensor 20 may be considered indirect. The computing device 22 may also function to control a plurality of sensors. For example, in one form, a movable barrier operator may function as a controller for multiple sensors, thereby acting as a central controller. Moreover, the movable barrier operator, when activated, may be used to initiate or otherwise control one or more sensors. In this regard, the sensors may be operating on a low power setting and then move to a higher power setting in response to the movable barrier operator.

The computing device 22 may also take a variety of forms. For example, the computing device 22 may take such forms as a computer, laptop, mobile phone, tablet, a vehicle telemetric system, a movable barrier operator, and other systems. In one form, the computing device 22 is a device configured to directly communicate with the sensor 20, such as via a wireless communication technology. As shown in FIG. 1, the computing device 22 may be located remotely from the sensor 20, such as in the form of a mobile phone 60 or a vehicle telemetry system 62.

Similarly, the display 24 may take a variety of forms. As noted above, the display 24 may be a stand-alone device or may be integrated with other devices. In one preferred form, the display 24 is integrated with the computing device 22, such as shown in FIGS. 2B and 2C. In this form, a user may be provided information about the sensor 20 via the display 24 and then configure the sensor 20 via the computing device 22, all through a single device. Exemplary devices described for the computing device 22 may be include an integrated display. Further, in some forms, the integrated display may be a touchscreen whereby a user can input selections via the screen which are then transmitted to the sensor 20.

The indicator 26 may also take a variety of forms as well as be a stand-alone device or be integrated with other devices. The indicator 26 may be any device suitable for providing feedback to a user regarding the status of the sensor 20 and/or vehicle. For example, the indicator 26 may provide feedback in the form of light, a display, sounds, vibrations, or other forms of feedback. As shown in FIG. 2C, the indicator 26 may be integral with the computing device 22 and display 24 as device 42. One exemplary form of device 42 might include a mobile phone such that the mobile phone can provide visual feedback, sounds, and/or vibration for the indicator 26. An alternative form is shown in FIG. 1 as indicator 58. In this form, indicator 58 may be integrated with or otherwise be associated with movable barrier operator 54. Indicator 58 may take the form of a light that can turn on, flash, or provide other feedback regarding the sensor 20 and or vehicle 12. For example, indicator 58 may flash more rapidly as the vehicle 12 approaches the sensor 50. In yet another form, the indicator may be coupled to the sensor 50, such as indicator 59 in FIG. 1.

The sensor 20 may include a variety of different configurable sensor settings, such as sensor parameters. For example, such settings include, but are not limited to, detection sensitivity (size of vehicle), detection duration, threshold distance (distance from sensor to vehicle), levels of distance (far away—green, getting close—yellow, almost there—orange, stop—red, too close flashing red, and the like), rate of approach offset, detection rate when idle, detection rate when active, threshold distance for an active state, approach speed, detection area, power consumption, power savings, and the like. Further, the sensor may be adjusted to have multiple settings, such as for different users, different locations of the secured area, different vehicles, and the like. In one form, one or more settings can be adjusted to provide decreased power consumption and/or extended battery life. For example, the sensor can be configured to be less responsive during different times of day. Similarly, the sensor can be configured to be more responsive when a condition or trigger occurs, such as if another sensor is activated, if light or movement is sensed, if the movable barrier operator is activated, or in response to other conditions or triggers.

These settings can be used to adjust a variety of functions of the sensor 20. For example, the settings can be used to adjust the detection of the vehicle to accommodate for differently sized and shaped vehicles. Further, the settings can permit the user to adjust detection rates, which allows control of battery utilization. By controlling parameters such as the detection rate, the user has the ability to extend the life of the battery if they desire at the cost of response time of the system. In one form, the computing device can provide the user with suggested settings and/or appropriate ranges for the settings. The computing device can guide the user by displaying information about the present configuration and ways to optimize it for battery life or other performance enhancing settings. The guidance can also be utilized in order to assist in the configuration of the detection and sensing of the vehicle.

Figure 3:
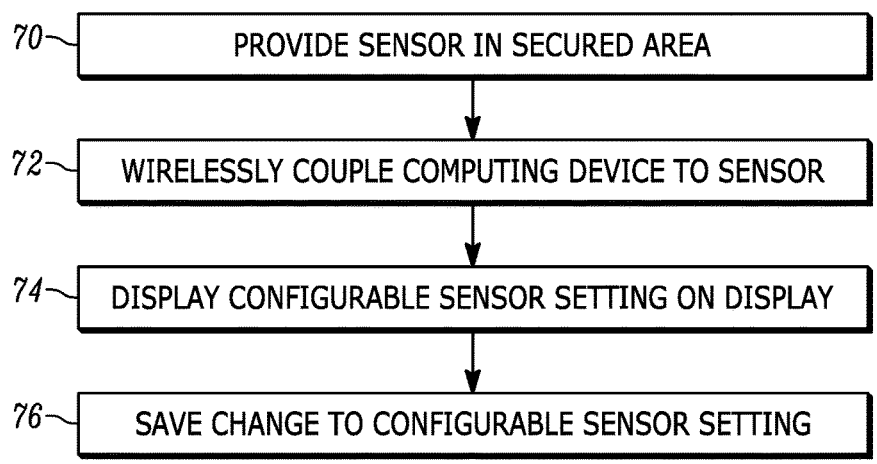
FIG. 3 is a block diagram representing one method of remotely configuring detection of a vehicle in a secured area.

The sensor 20 can be installed and adjusted as found in the flow diagram of FIG. 3. The sensor 20 is provided in a secured area, such as in step 70. The computing device 22 is then wirelessly coupled to the sensor 20, such as at step 72. One or more configurable sensor settings can be shown on the display 24, such as at step 74. The user can then manipulate the one or more sensor settings, such as through the display in the case of a touchscreen, or other input device. Once the sensor setting has been changed, the change can be saved, such as at step 76.

The above described sensor settings can be adjusted via the computing device 22 during installation of the sensor 20 and/or after the sensor 20 has already been installed and in use. For example, the sensor may be initially configured form the default settings for one particular vehicle or user, but then later reconfigured for a different vehicle and/or user.

The sensor settings may also be configured in real time such that the sensor is providing information to the computing device 22 about the current status of the sensor 20. In other words, a user can be in a vehicle, such as in the passenger seat, while a driver guides the vehicle in the secured area whereby the user can adjust settings while in motion or while otherwise in the vehicle. In one form, the information from the sensor 20 may be provided substantially in real-time to the computing device 22 so the user can more easily appreciate the differences when changing sensor settings.

Figure 4:
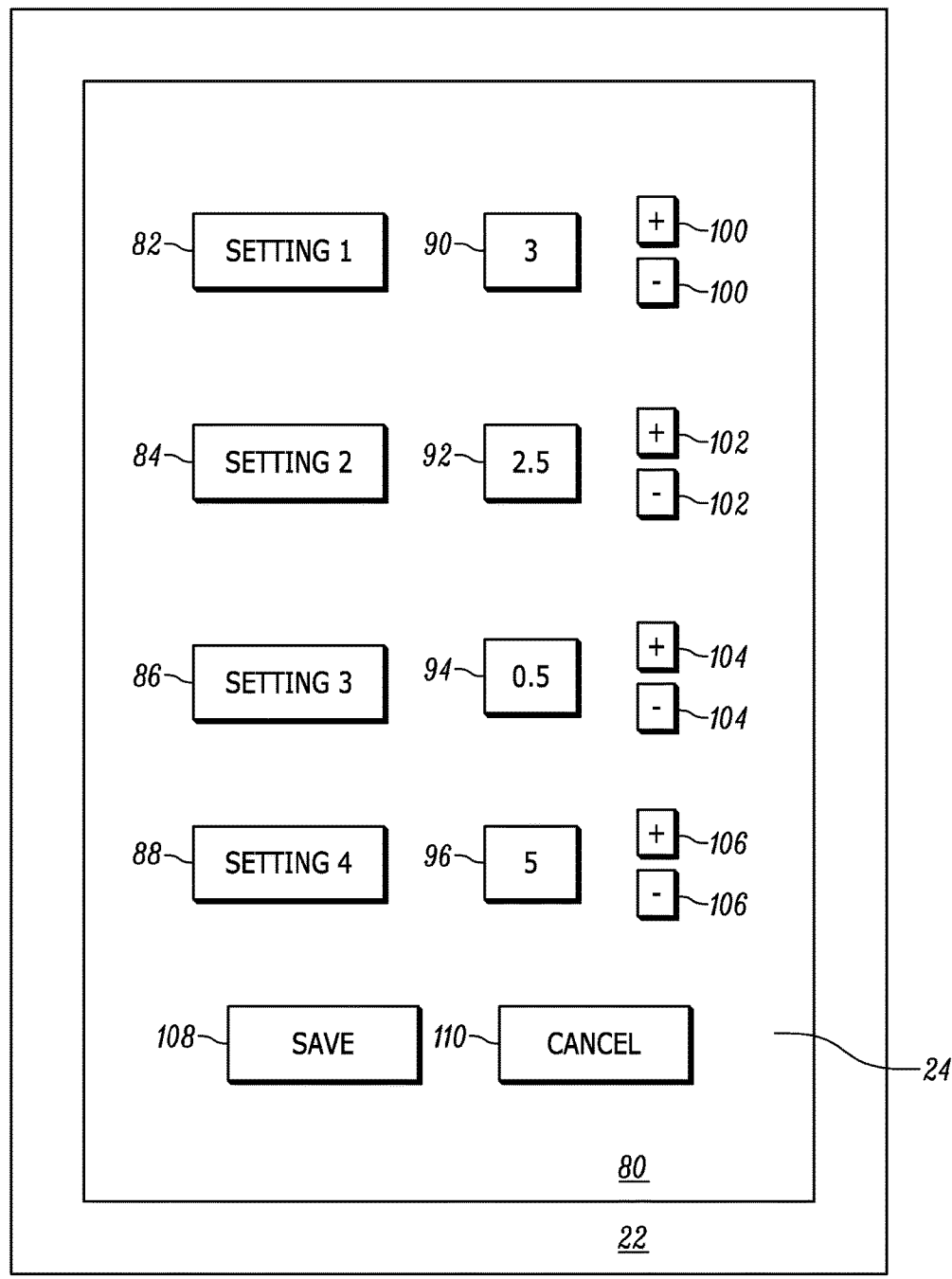
FIG. 4 is an illustration of a computing device having a display permitting remote configuration of a sensor.

A diagram of an exemplary interface 80 for adjusting sensor settings is shown in FIG. 4. In this figure, various sensor settings 82, 84, 86, 88 are shown which can be configured from the computing device 22. The display 24 also shows current settings 90, 92, 94, 96 as well as inputs 100, 102, 104, 106 for adjusting the settings 82, 84, 86, 88. After the settings 90, 92, 94, 96 have been adjusted via the inputs 100, 102, 104, 106, the changes can either be saved at 108 or cancelled at 110. Any number of settings be shown on an interface 80. Similarly, multiple interfaces may be used to adjust any number of desired sensor settings. The interface 80 can be used to provide information such as the current sensor status prior to changing, a preferred range for various sensor settings, a total range, the actual value measured as the vehicle is moving, as well as other information from the sensor 20 or otherwise available for adjustment on the sensor 20. Further, the sensor can be configured using settings available from a cloud computer. For example, a user can input information, such as the make and model of a vehicle, and settings can be downloaded from a cloud computer that are more specific to the particular vehicle. In yet another form, the vehicle may be configured to provide information about the specific vehicle to the sensor and/or system. For example, the vehicle may broadcast information about the make/model of the vehicle which may be used to help configure the sensor and/or cause the sensor to enter/exit different modes of operation.

The sensor settings can be adjusted by permitting a user to pick from suggested settings, pick from setting ranges, pick specific settings chosen by the user, and the like. As an example, a distance sensor setting can be adjusted to display a traffic light where the light changes according to the distance. In this regard, the transition distances for changing from green, to yellow, to red, can be adjusted such that green may be for 10-6 feet, yellow for 6-3 feet and red at 2 feet. Similarly, as noted above, a user can download information specific to a particular vehicle. Additionally, a user may select an image of a vehicle, as well as use the image to pinpoint certain portions of the vehicle relative to locations in the secured area that is being sensed by the sensor.

Figure 5:
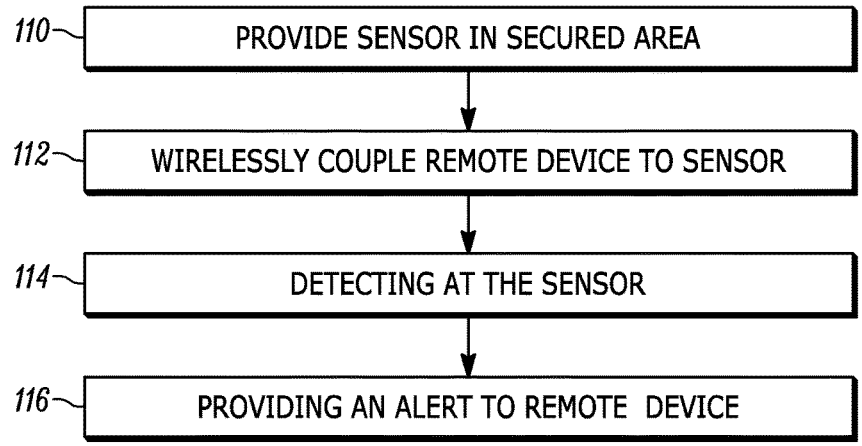
FIG. 5 is a block diagram representing a method of detecting a vehicle in a secured area.

In use, the sensor 20 can provide information about the sensor 20 to a remote device, such as a computing device, indicator, and the like. As shown in FIG. 5, the sensor is provided in a secured area at step 110, the remote device is wirelessly coupled to the sensor at step 112, the sensor detects a vehicle or other object at step 114, and then the sensor provides an alert or other information to the remote device at step 116. As discussed previously, the sensor 20 can be used for a variety of detection functionalities including, but not limited to the presence/absence of a vehicle, the distance of a vehicle, the approach speed of a vehicle, the relative position of a vehicle, the type of vehicle detected, and other related features. This information can be relayed to the remote device. For example, the sensor 20 can detect a vehicle moving in the secured area and provide signals to an indicator indicative of features such as the rate of approach, distance, and the like. The indicator can then provide feedback to a user based on this information. Additionally, the sensor 20 can detect a vehicle and then have one or more computing devices determine what vehicle has been detected, based on the detected signal.

Figure 6:
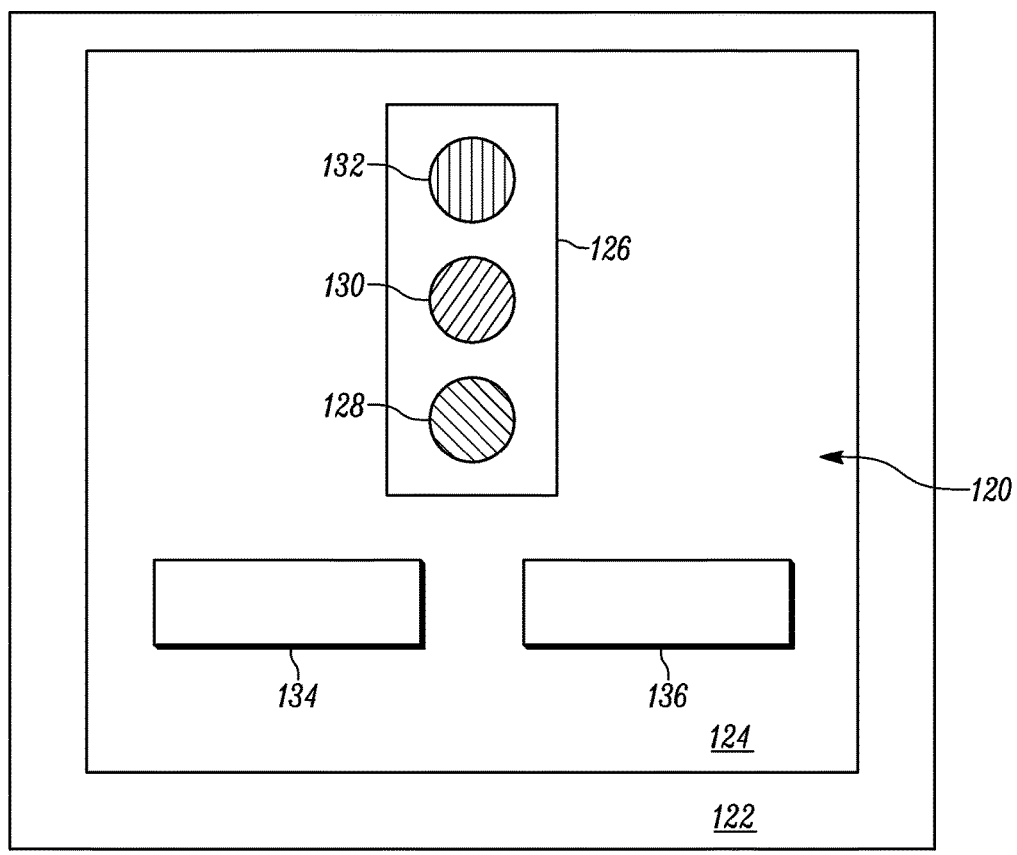
FIG. 6 is an illustration of a computing device having a display alerting detection of a vehicle in a secured area.

For example, as shown in FIG. 6, one form of an indicator 120 is shown as being part of a mobile phone 122 having a screen 124. The mobile phone 122 is in wireless communication with a sensor, such as sensor 20. The screen 124 can display indicia, such as in the form of a street light 126 that can provide relative information about the rate of approach, distance, etc. of the vehicle in a secured area as detected by the sensor. The street light 126 can show a first light 128 indicating that a vehicle is far from the sensor, a second light 130 as the vehicle gets closer to the sensor, and finally a third light 132 indicating that the vehicle is close to the sensor. The distances at which each of the lights 128, 130, 132 activate may be configured as a sensor setting, as discussed above. Further, the indicator 120 can include other indicia, such as numerical box 134 which presents a numerical readout of the sensed information, such as distance, rate of approach, and the like. The indicator can also include a simple indicator 136 that can simply activate, such as by changing color, when a set threshold, such as when the rate of approach, distance, and the like, is exceeded.

In another form, the sensor 20 can be used in combination with movable barrier operator 54. The movable barrier operator 54 can identify to the sensor 20 when to expect the vehicle will be approaching, notifying the sensor 20 to increase its detection rate or just turn on. In this regard, the sensor 20 can use less power as it will not be actively sensing or otherwise sensing at a lower sample rate until triggered, which can result in increased battery life for battery powered sensors. Sensing at the garage or operator of any form of activity (for example, door opening, wall control interaction, infrared detection by the movable barrier operator, photo-beam interruption, door edge interaction, and the like) can be sent to the sensor to trigger its operation, an automatic setting change, or its shutting down.

The sensor can also send information to the movable barrier operator. In this situation the sensor can detect the vehicle and its parking location and notify the movable barrier operator so that it can identify to the user by flashing its work light as an indicator. The sensor can also be used to help detect which vehicle has been detected. For example, the sensor may detect the vehicle of a first user leaving, while the vehicle of a second user remains. This information can be used to connect to an automation system and perform various functions.

In yet another form, the system can be considered a "learning" system whereby the system learns the habits of the users. For example, the system can determine that a user typically enters and/or exits the secured area at certain times of the day. The system can then adjust when the sensor is most active and consumes the most power, thereby conserving power at other times of the day. Similar learning can occur for different seasons, users, and the like. The system may also learn to perform different functions when a mobile device is detected as approaching and/or leaving the secured area. For example, the system may detect a mobile phone through Bluetooth and then cause the sensors to be in the most active setting. These learned features can also be used in combination with one another.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for remotely configuring detection of a vehicle in a secured area for housing the vehicle, the method comprising:
   wirelessly coupling a vehicle computing device to a movable barrier operator, the movable barrier operator being operatively coupled to a sensor disposed in the secured area and configured to detect the vehicle;
   displaying a configurable sensor setting on a display of the vehicle computing device, the configurable sensor setting including at least one of the group consisting of: a detection sensitivity, a detection duration, a threshold distance, a rate of approach, a detection rate when idle, a detection rate when active, a threshold distance for an active state, modes of operation, and a detection area;
   receiving by the vehicle computing device a user input indicating a change to the configurable sensor setting;
   communicating the change to the configurable sensor setting from the vehicle computing device to the sensor via the movable barrier operator; and
   causing the change to the configurable sensor setting to be saved at the sensor.

2. The method of claim 1 further comprising providing a signal to the vehicle computing device indicative of sensing the vehicle in the secured area.

3. The method of claim 1 further comprising displaying the current status of the configurable sensor setting.

4. The method of claim 1 further comprising displaying a range of adjustment available for the configurable sensor setting.

5. A system for remotely configuring detection of a vehicle in a secured area for housing the vehicle, the system comprising:
   a movable barrier operator;
   a sensor disposed in the secured area and having a configurable sensor setting, the sensor configured to be coupled to the movable barrier operator;
   a vehicle computing device configured to be wirelessly coupled to the movable barrier operator; and
   a display of the vehicle computing device configured to display the configurable sensor setting,
   wherein the configurable sensor setting includes at least one of the group consisting of: a detection sensitivity, a detection duration, a threshold distance, a rate of approach, a detection rate when idle, a detection rate when active, a threshold distance for an active state, modes of operation, and a detection area; and
   the vehicle computing device further configured to facilitate communicating a change to the configurable sensor setting received at the vehicle computing device to the sensor via the movable barrier operator.

6. The system of claim 5 further comprising an indicator providing an alert indicative of sensing a vehicle in the secured area, the alert selected from the group consisting of: text, graphics, lights, vibration, audio, and combinations thereof.

7. The system of claim 6 wherein the indicator is the display.

8. The system of claim 6 wherein the indicator is selected from the group consisting of: a light, a speaker, an indicator of the movable barrier operator, a vehicle display system, a mobile computing device, an automation interface, and combinations thereof.

9. The system of claim 5 wherein the sensor is configured to detect at least one of a position of the vehicle in the secured area, a presence of the vehicle in the secured area, a rate of approach of the vehicle to the sensor, a change in movement of the vehicle in the secured area, and a distance of the vehicle from the sensor.

10. The system of claim 5 wherein the sensor is configured to detect the vehicle through at least one of sound, light, radio, induction, capacitive, thermal, and vibration.

11. A method for detection of a vehicle in a secured area for housing the vehicle, the method comprising:
- wirelessly coupling a vehicle computing device to a sensor disposed in the secured area and configured to detect the vehicle, the sensor operatively coupled to a movable barrier operator in the secured area;
- detecting at the sensor at least one of a distance of the vehicle from the sensor, a rate of approach of the vehicle to the sensor, and a position of the vehicle in a predetermined position relative to the sensor;
- providing an alert from the sensor to the vehicle computing device via the movable barrier operator, the alert indicative of the detection at the sensor of at least one of the distance of the vehicle from the sensor, the rate of approach of the vehicle to the sensor, and the position of the vehicle in a predetermined position relative to the sensor; and
- receiving a user input indicating a change to a configurable sensor setting of the sensor from the vehicle computing device via the movable barrier operator, the user input caused by manipulation of the configurable sensor setting presented on a display of the vehicle computing device, the configurable sensor setting including at least one of a threshold distance, a rate of approach, and a detection area.

12. The method of claim 11 further comprising receiving a user input indicating a change to a configurable sensor setting of the sensor from the vehicle computing device via the movable barrier operator, the configurable sensor setting including at least one of: a detection sensitivity, a detection duration, a detection rate when idle, a detection rate when active, a threshold distance for an active state, and a mode of operation.

13. The method of claim 12 further comprising displaying a range of adjustment available for the configurable sensor setting at the vehicle computing device.

14. The method of claim 11 further comprising providing an alert indicative of sensing a vehicle in the secured area, the alert selected from the group consisting of: text, graphics, lights, vibration, audio, and combinations thereof.

15. The method of claim 14 wherein the alert is provided at the vehicle computing device.

16. The method of claim 14 wherein the alert is provided at a device other than the vehicle computing device.

17. The method of claim 11 wherein the detecting at the sensor begins in response to at least one of the group consisting of: operation of the movable barrier operator, approach of a mobile computing device, and detection of motion in the secured area.

18. The method of claim 17 further comprising operating the sensor in a passive, power saving mode until the detecting step begins in response to at least one of the group consisting of: operation of the movable barrier operator, approach of a mobile computing device, and detection of motion in the secured area.

19. The system of claim 5 wherein the vehicle computing device includes a vehicle telemetry system.

\* \* \* \* \*